Patented Feb. 25, 1941

2,232,927

UNITED STATES PATENT OFFICE 2,232,927

MAKING UNSATURATED ETHERS OF CELLULOSE

Floyd C. Peterson and Arthur J. Barry, Midland, Mich., assignors to The Dow Chemical Company, Midland, Mich., a corporation of Michigan No Drawing. Application January 28, 1939, Serial No. 253,445

1 Claim. (Cl. 260—231)

This invention relates to a method for the preparation of unsaturated ethers of cellulose and especially to such a method carried out at low temperatures in the presence of anhydrous liquid ammonia.

In a co-pending application, Serial No. 187,655, filed January 29, 1938, now U. S. Patent No. 2,157,083, issued May 2, 1939, of which the present application is a continuation-in-part, there is disclosed a new method for the preparation of cellulose ethers. The said new method comprises reacting substantially anhydrous cellulose with an alkali metal in a medium comprising anhydrous liquid ammonia, and in the presence of a liquid hydrocarbon such as toluene which is inert to the cellulose and liquid ammonia, and substantially inert to the action of alkali metal. This reaction produces an alkali cellulosate which is thereafter reacted in a liquid ammonia medium with an etherifying agent which, in the aforesaid co-pending application, was defined as an alkyl or aralkyl halide or sulphate or substitution products of such compounds.

In another of our co-pending applications, Serial No. 187,654, filed January 29, 1938 now U. S. Patent No. 2,145,273, issued January 31, 1939, there is disclosed and claimed a method for the preparation of alkyl or aralkyl ethers of cellulose comprising first reacting cellulose with an alkali amide in liquid ammonia, and then etherifying the so-formed alkali cellulosate.

The present invention is concerned with a method for the preparation of unsaturated ethers of cellulose, such as the allyl, 2-methyl allyl, crotyl and cinnamyl ethers, all of which have an olefinic double bond in the aliphatic residue. Allyl cellulose, which is typical of the group, has been prepared heretofore by the customary methods applied to the formation of cellulose ethers. Cellulose ethers are usually prepared from alkali cellulose rather than from alkali metal hydroxylates of cellulose. The alkali cellulose usually employed is prepared by treating cellulose with aqueous caustic alkali. In such methods a large excess of alkali is required, the alkali cellulose product contains water, and is often not uniform in composition. In the preparation of cellulose ethers from such aqueous alkali cellulose prepared as aforesaid, the latter is reacted with an etherifying agent by heating together under pressure for several hours. For the reaction, a very large excess of etherifying agent is required, much of which at the temperature of the reaction and in the presence of water, is converted by side reactions into undesired secondary products. The unsaturated ethers of cellulose heretofore produced, when first prepared, have been insoluble, or but slightly soluble in the customary solvents for alkyl ethers of cellulose. This is presumed to be due to the polymerization of unsaturated cellulose ethers at the elevated temperatures employed in the etherification reaction.

It is accordingly among the objects of the invention to provide a low temperature method for the preparation of unsaturated ethers of cellulose. It is a particular object to provide such a method whereby the unsaturated cellulose ethers may be obtained in a solvent-soluble, substantially unpolymerized form.

According to the invention, substantially anhydrous cellulose is suspended in anhydrous liquid ammonia and converted to an alkali cellulosate according to either of the methods described in the aforesaid co-pending applications, Serial Nos. 187,654-5. Regardless of the manner in which the alkali cellulosate is prepared in the liquid ammonia medium, after the reaction has gone to completion, there may be added to the suspension of alkali cellulosate in liquid ammonia an unsaturated aliphatic or aryl aliphatic halide or sulphate. Examples of the preferred etherifying agents are allyl bromide, 2-methyl allyl bromide, cinnamyl bromide, crotonyl bromide, etc. The corresponding chlorides or sulphates may be used. To the alkali cellulosate is added from 1 to 12, and preferably from 3 to 5, equivalent weights of unsaturated etherifying agent per atom of alkali metal in the cellulosate. There may also be present in the reaction vessel a liquid aromatic hydrocarbon, to serve as a dispersion agent or solvent for the cellulose ether. After the etherifying agent has been added to the cellulosate in the desired proportion the mixture is allowed to stand, preferably with occasional agitation, until the etherification reaction is complete. This ordinarily requires from 3 to 24 hours and most frequently is finished in from 8 to 12 hours, depending upon the etherifying agents employed, the temperature of the reaction and the number of atoms of alkali metal substituted in the cellulose molecule. The temperature of etherification may range from −80° C. to +25° C. and the reaction is carried out under the corresponding vapor pressure of liquid ammonia. For ease of operation, temperatures near −33° C., the boiling point of liquid ammonia, are preferred. We prefer to carry out the etherification reaction while the liquid ammonia is at atmospheric pressure and while it is being allowed to volatilize slowly away from the reaction mixture. Due to the low or moderate temperature employed in the etherification reaction and to the absence of water, side reactions and decomposition of etherifying agent are reduced to a minimum and the excess of etherifying agent can be substantially recovered as such from the reaction product.

The following examples illustrate the practice of the invention:

Example 1

162 parts (1 mole) of cellulose and 69 parts (3 moles) of sodium are reacted in 3200 parts of liquid ammonia in the presence of 500 parts of toluene at −33° C. When the reaction is complete, as evidenced by the disappearance of the blue color of sodium in liquid ammonia, the ammonia is allowed to volatilize until 900 parts thereof remain in the reaction vessel. 410 parts (5 moles) of allyl chloride dissolved in 1000 parts of toluene are slowly poured into the sodium cellulosate suspension while the mixture is agitated and while the temperature is held at or near −33° C. This temperature is maintained for about 8 hours and the mixture is then allowed to warm up gradually to about 25° C., the ammonia distilling away from the reaction product in the meantime. The product is washed with petroleum ether to remove excess reagent, is dissolved in a solvent mixture of 80 parts toluene and 20 parts ethanol by volume, and centrifuged to remove unetherified fibrous material. The solution so-obtained contains 175 parts by weight of allyl cellulose which can be cast into films, spun into fibers, and otherwise handled in a manner similar to that employed in connection with the usual solvent-soluble ethers of cellulose. When the solution or any product deposited therefrom is heated to a temperature in the range from 60° to 100° C., the allyl cellulose becomes insoluble, indicating that polymerization is occurring.

Example 2

94 parts (4 moles) of sodium was added to 4300 parts of liquid ammonia in the presence of a small amount (1.9 parts) of ferric nitrate catalyst and the mixture agitated for 1.5 hours until the sodium had all reacted to form sodium amide. At this point, there was added 162 parts (1 mole) of substantially anhydrous cellulose. The mixture was stirred and the ammonia allowed to evaporate slowly until only sufficient ammonia (approximately 180 parts) remained to keep the alkali cellulosate "moist" with ammonia. To the mixture was added 680 parts (6 moles) of allyl bromide in 2300 parts of toluene. The resulting reaction mixture was thoroughly agitated while the temperature was held at or below −33° C. for about 10 hours, and then allowed to rise to 25° C. while the remaining ammonia boiled off. There was obtained 272 parts of allyl cellulose which was soluble in 80/20 toluene-ethanol solvent and which, when heated, deposited the insoluble, polymerized variety of allyl cellulose.

Example 3

To 230 parts (1 mole) of sodium cellulosate, prepared as in Example 1, suspended in 570 parts of liquid ammonia, was added 470 parts (3 moles) of cinnamyl chloride dissolved in 1500 parts of toluene. The reaction was carried out at −33° C. and at atmospheric pressure. After about 10 hours, the ammonia was allowed to evaporate freely from the reaction vessel and the temperature of the reaction mixture was permitted to rise to about 25° C. The so-formed cinnamyl cellulose was soluble in the usual organic solvents for cellulose ethers.

The unsaturated ethers of cellulose are particularly desirable because of their potential insolubility in many of the customary solvents. This insolubility is preferred after fabrication, rather than before. They have heretofore been difficult to handle because they have been converted to the insoluble form in most instances during the etherification reaction. The present invention provides a convenient method for producing the unsaturated ethers of cellulose in a solvent-soluble form so that they may be handled readily and fabricated into the desired articles prior to subjecting them to the action of heat, ultra-violet light, or other of the known polymerizing or insolubilizing agents for unsaturated cellulose ethers.

Other modes of applying the principle of our invention may be employed instead of those explained, change being made as regards the method and material herein disclosed, provided the step or reactants stated by the following claim, or the equivalent of such stated step or reactants, be employed.

We therefore particularly point out and distinctly claim as our invention:

The method which comprises reacting an alkali metal cellulosate, in a medium comprising liquid ammonia and toluene, at a temperature of about −33° C., with an excess over the theoretical amount of an allyl halide, for about 8 to 10 hours, removing remaining ammonia while allowing the mixture to warm up to about 25° C., and, by removal of toluene, recovering the so-formed allyl ether of cellulose in a form which is soluble in 80/20 toluene-ethanol, and which, when heated to a temperature of from 60° to 100° C., is convertible to the insoluble, polymerized variety of allyl cellulose.

FLOYD C. PETERSON.
ARTHUR J. BARRY.